United States Patent [19]

Pabla et al.

[11] Patent Number: 5,734,243
[45] Date of Patent: Mar. 31, 1998

[54] DUAL CONTROL OF WINDSHIELD WIPER SYSTEM

[75] Inventors: Parmjit S. Pabla, Fort Wayne; Merrill D. Miller, Huntington, both of Ind.

[73] Assignee: Navistar International Transportation Corp., Chicago, Ill.

[21] Appl. No.: 717,382

[22] Filed: Sep. 23, 1996

[51] Int. Cl.⁶ .................................................. B60S 1/08
[52] U.S. Cl. ...................... 318/443; 318/548; 318/DIG. 2
[58] Field of Search ...................................... 318/443, 444, 318/483, 546, 547, 548, DIG. 2; 307/9.1, 10.1

[56] References Cited

U.S. PATENT DOCUMENTS

| 4,352,401 | 10/1982 | Vitaloni. | |
|---|---|---|---|
| 4,726,441 | 2/1988 | Conley. | |
| 5,449,956 | 9/1995 | Williams | 307/10.1 |

OTHER PUBLICATIONS

"Electrical Circuit Diagrams—2000, 4000, 8000 Truck and Tractor" Manual No. CTS–5122S (Jan. 1995) Navistar International Transportation Corp., Dec. 1994, pp. 36–37.

*Primary Examiner*—Bentsu Ro
*Attorney, Agent, or Firm*—Dennis K. Sullivan

[57] ABSTRACT

A circuit for implementing dual wash/wipe controls in an automotive vehicle having right- and left-side driver stations. The circuit can be used with existing wash/wipe control switches and comprises solid state diodes, a single selector switch, and a single relay, connected in a novel configuration with other existing components. The selector switch selects a wash/wipe switch at either one of the driver stations to have control over an electric-motor driven wiper motor to the exclusion of a wash/wipe switch at the other driver station. Diodes couple each wash/wipe switch to a wash/wipe electronic control module that in turn operates the electric-motor driven wiper motor.

20 Claims, 2 Drawing Sheets

5,734,243

DUAL CONTROL OF WINDSHIELD WIPER SYSTEM

FIELD OF THE INVENTION

This invention relates to automotive vehicles that have an electric-motor-operated windshield wiper system and that have driver stations on both right and left sides of the vehicle.

BACKGROUND AND SUMMARY OF THE INVENTION

Vehicles that have dual driver controls are used in various applications, such as street sweepers or as curbside collectors of trash, garbage, and/or recyclable materials. For example, a collection truck that services residential areas is often operated by a single person who must both drive the vehicle from stop to stop and also get out at each stop to load the curbside collection into collection bins on the vehicle. Since curbside collections may take place on either or both the right and left sides of a street depending on the nature of the neighborhood bordering the street and on the direction of travel of a truck along the street, a vehicle that has both right- and left-side driver stations each equipped with its own set of driver controls should enable a single person to perform this collection service with greater overall efficiency than if the vehicle had only a single driver station on one particular side.

One of the dual controls is a wash/wipe control for controlling the operation of a vehicle's windshield washing and wiping system. A known type of windshield washing and wiping system comprises an electric-motor-operated windshield wiping mechanism and an electric-operated pump that pumps washer fluid onto the windshield to facilitate cleaning. Such a wiping system has a capability for high speed wiping, low speed wiping, and intermittent wiping. This capability is furnished by an electronic control module that operates the wiper motor via relays to cause the motor to operate in one of the three aforementioned conditions as selected by a wiper motor control switch that constitutes one of the controls at the driver's station in a single station vehicle, and is duplicated at a second station when the vehicle has dual driver control stations.

The wiper control switch and the washer control switch are sometimes provided in a control stalk that is mechanically pivoted on a turn signal switch body mounted on the vehicle's steering column for operating the vehicle's turn signals. For example, the wiper control switch may be a rotary type that is rotated about the axis of the control stalk to different positions, namely off, low speed, high speed, and intermittent. The washer control switch may also be a rotary switch, or alternatively perhaps, a push-button switch.

A prior implementation of a dual control for a windshield wash/wiper utilized four relays, a toggle switch, and a significant amount of wire to provide the dual control. A substantial number of mechanical connections of the wires to the relays were required.

The present invention is directed toward a less complex, and less costly, circuit for implementing dual wash/wipe controls in an automotive vehicle. Especially significant is the fact that the circuit can be used with existing wash/wipe control switches, thereby avoiding added expense of changing or re-designing these switches. The inventive circuit comprises the use of solid state diodes, a single selector switch, and a single relay, connected in a novel configuration with other existing components.

The foregoing, along with further features, advantages, and benefits of the invention, will appear in and from the following detailed description of a presently preferred embodiment representing the best mode contemplated at this time for carrying out the invention.

DESCRIPTION OF THE PREFERRED EMBODIMENT

Figure 1:
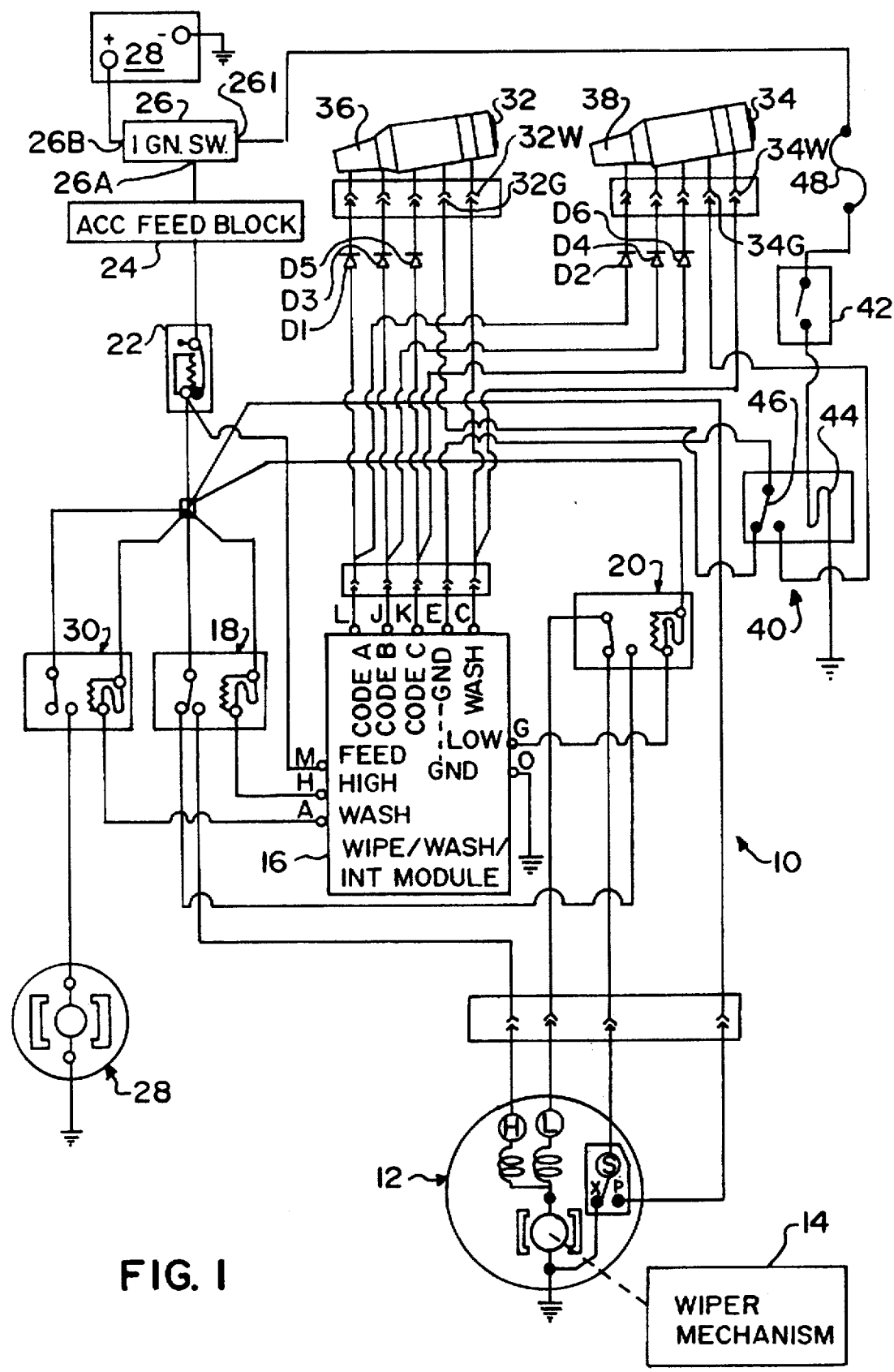
FIG. 1 is a general schematic diagram of an electric-motor-operated windshield wash/wipe system, including dual wash/wipe control switches, embodying principles of the invention.

FIG. 1 shows an electric-motor-operated windshield wash/wipe system 10 comprising an electric windshield wiper motor 12 that operates a wiper mechanism 14. Specific details of the motor and wiper mechanism will not be described in the interest of brevity since they are conventional. The example depicted by FIG. 1 shows a system that provides high-speed operation, low-speed operation, and intermittent operation of the motor and wiper mechanism. This capability is furnished by an electronic control module 16, also conventional, that operates wiper motor 12 via a high-speed relay 18 and a low-speed relay 20 connected in circuit with module 16 as shown. Voltage for operating motor 12, module 16 and relays 18 and 20 is supplied through a circuit protection device 22 from an accessory feed block 24 that is connected to an accessory terminal 26A of a conventional ignition switch 26. Ignition switch 26 is operable to off, accessory, run (sometimes called "on"), and start (sometimes called "crank") positions, and includes a battery terminal 26B connected to the ungrounded (positive in this circuit) terminal of the vehicle's D.C. power supply 28, and an ignition terminal 26I. Accessory terminal 26A is connected to battery terminal 26B when ignition switch 26 is in the accessory and run positions, and ignition terminal 26I is connected to battery terminal 26B when ignition switch 26 is in the run position. The accessory and run positions are non-off positions that allow wash/wipe system 10 to operate.

System 10 further includes an electric-operated windshield washer pump 28 for dispensing washer fluid onto the vehicle's windshield to aid in cleaning. A wash relay 30 operatively connects pump 28 with protection device 22 and module 16 in conventional fashion.

Dual control of motor 12, and hence of wiper mechanism 14, comprises dual wipe/wash control switches 32, 34 respectively, located at respective right- and left-side driver control stations of the vehicle. As mentioned earlier, each switch 32, 34 comprises a respective wiper control switch 32WI, 34WI (FIG. 2) and a respective washer control switch 32WA, 34WA (FIG. 2) provided in a respective control stalk 36, 38 that is mechanically pivoted on a turn signal switch body on the vehicle's steering column for operating the vehicle's turn signals.

Figure 2:
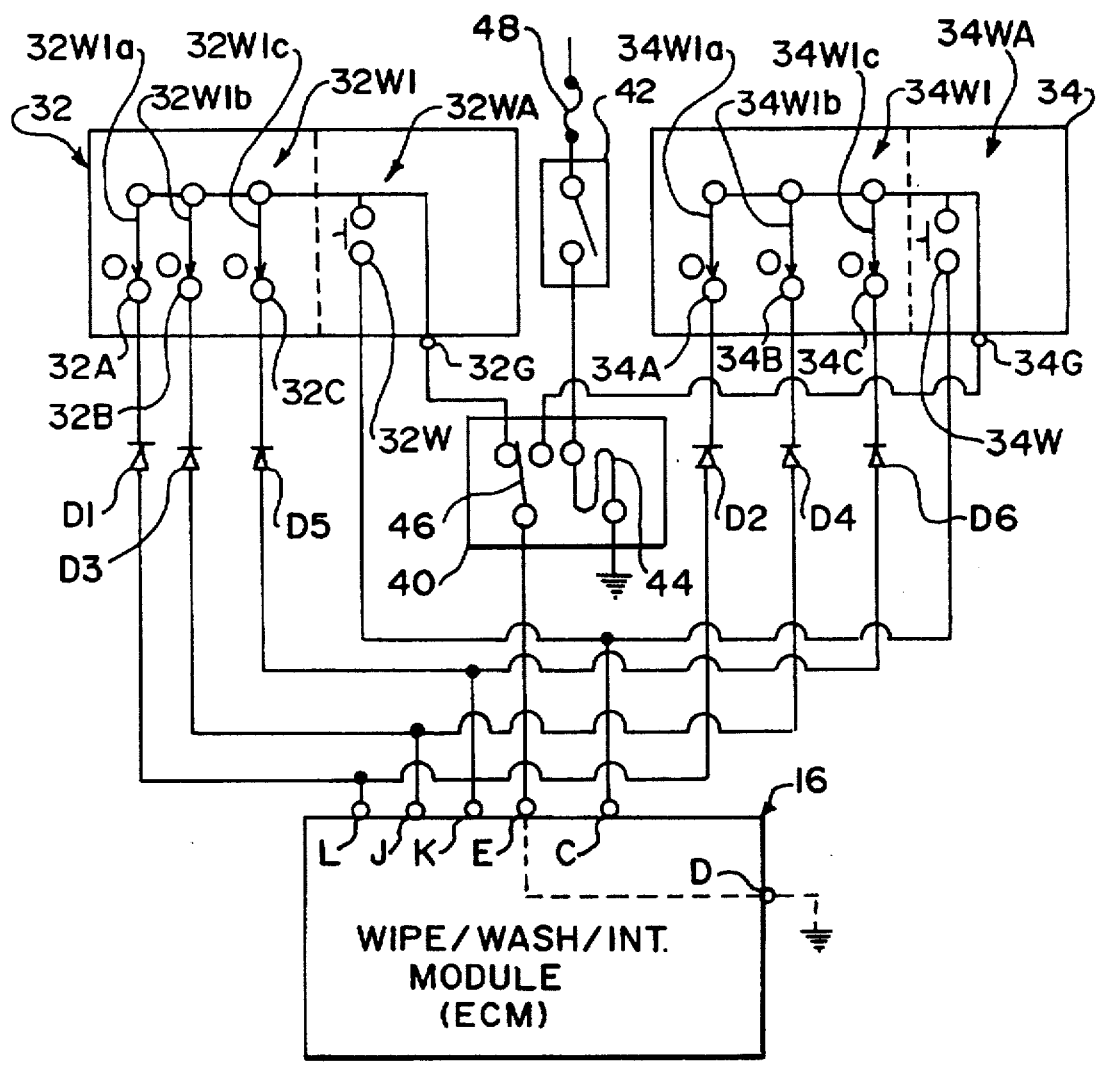
FIG. 2 is a more detailed schematic diagram of certain portions of FIG. 1, and includes associated logic diagrams showing operating logic.

FIG. 2 shows further detail of the exemplary embodiment of the invention. Wiper control switch 32WI comprises three normally closed switches 32WIa, 32WIb, and 32WIc while wiper control switch 34WI also comprises three normally closed switches 34WIa, 34WIb, and 34WIc. Washer control switches 32WA, 34WA each comprises a single normally open switch. Each switch 32, 34 comprises a respective input terminal 32G, 34G, and four respective output terminals 32A, 32B, 32C, 32W, and 34A, 34B, 34C, and 34W, respectively.

In wash/wipe control switch 32, one side of each switch 32WIa, 32WIb, 32WIc, and 32WA is connected to input terminal 32G while the other side of each respective switch 32WIa, 32WIb, 32WIc, and 32WA is connected to a respective output terminal 32A, 32B, 32C, 32W. In wash/wipe control switch 34, one side of each switch 34WIa, 34WIb, 34WIc, and 34WA is connected to input terminal 34G while the other side of each respective switch 34WIa, 34WIb, 34WIc, and 34WA is connected to a respective output terminal 34A, 34B, 34C, 34W.

Electronic control module 16 comprises a number of terminals, as shown in FIG. 1, identified as A, C, D, E, G, H, J, K, L, and M in that FIG. Terminal D is connected to ground; terminal G to the coil of relay 20; terminal M to circuit protection device 22; terminal H to the coil of relay 18; and terminal A to the coil of relay 30. Thus the vehicle power supply voltage is delivered to module 16 across terminals M and D. Module 16 operates to provide respective output control signals at terminals A, H, E, and G in accordance with input signals supplied to terminals L, J, K, and C.

In accordance with the inventive principles, six diodes D1, D2, D3, D4, D5, and D6, a relay 40, and a selector switch 42 are employed in association with system 10 to enable one of the dual wipe/wash control switches 32, 34 to exercise control over the system to the exclusion of the other, depending on the position of selector switch 42, which is depicted as a toggle switch that can be manually placed in a first position to select switch 32 to the exclusion of switch 34 and in a second position to select switch 34 to the exclusion of switch 32.

The respective cathodes of the respective diodes D1 and D2, are connected to switch terminals 32A and 34A respectively; the respective cathodes of the respective diodes D3 and D4, are connected to switch terminals 32B and 34B respectively; and the respective cathodes of the respective diodes D5 and D6, are connected to switch terminals 32C and 34C respectively. The anodes of diodes D1 and D2 are connected to the common terminal L of module 16; the anodes of diodes D3 and D4 are connected to the common terminal J of module 16; and the anodes of diodes D5 and D6 are connected to the common terminal K of module 16. Terminals 32W and 34W are connected to the common terminal C of module 16.

Relay 40 comprises a coil 44 forming a control input, and a movable contact 46 forming a controlled output. One side of coil 44 is connected to ignition switch terminal 26I through a series circuit containing selector switch 42 and a circuit protection device 48. The other side of coil 44 is connected to ground. Contact 46 is connected to terminal E of module 16 such that when coil 44 is not energized, as shown in the FIGS., contact 46 connects terminal 32G of switch 32 to terminal E of module 16, and when coil 44 is energized (not shown in the FIGS.), contact 46 connects terminal 34G of switch 34 to terminal E of module 16. As shown in FIG. 2, terminal E of module 16 is internally connected to grounded terminal D. Consequently, when coil 44 is not energized, a ground signal is supplied to terminal 32G of switch 32 while terminal 34G of switch 34 is left floating, and when coil 44 is energized, a ground signal is supplied to terminal 34G of switch 34 while terminal 32G of switch 32 is left floating. It is the application of a ground signal to terminal 32G that enables switch 32 to exercise control over system 10 to the exclusion of switch 34, and the application of a ground signal to terminal 34G that enables switch 34 to exercise control over system 10 to the exclusion of switch 32.

When selector switch 42 is in the open position shown, relay coil 44 cannot be energized, even when ignition switch 26 is in the run position. As a result, relay 40 delivers a ground signal input to switch 32, enabling switch 32 to control the system to the exclusion of switch 34. It can therefore be perceived that ignition switch 26 must be in the run position in order for control to transfer from switch 32 to switch 34 by operating selector switch 42 to closed position.

By operating the one enabled switch 32, 34 to high-speed, low-speed, and intermittent positions, ground signals are applied to terminals L, J, and K of module 16, through the respective switches 32WIa, 32WIb, 32WIc in the case of switch 32 being enabled, and through switches 34WIa, 34WIb, 34WIc in the case of switch 34 being enabled. The module interprets these signals to produce the desired operation of motor 12 by delivering appropriate signals to the appropriate output terminals of the module.

The poling of the diodes enables transmission of the ground signals from the enabled switch 32, 34 while undesired feedback to the non-enabled switch 32, 34 is prevented. Avoidance of feedback is vital because the switches 32WIa, 32WIb, 32WIc, 34WIa, 34WIb, 34WIc are normally closed when the wiper motor is not to be operated. Since the washer switches 32WA, 34WA are normally open, they inherently prevent feedback unless the non-enabled switch 32, 34 is having its washer switch concurrently operated closed.

The inventive circuit can be readily adapted to an existing vehicle design by incorporating the diodes, the relay 40, and the selector switch 42 in a suitable overlay wiring harness that can be interposed between an existing vehicle wiring harness and the wash/wipe switches 32, 34, with relay 40 and selector switch 42 being mounted in suitable locations in the vehicle. The circuit can also be integrated into a new wiring harness that is installed at the time of building a new vehicle.

While the intermittent wipe position has been shown as a single position, it could have several different positions, each providing a different amount of delay.

While a presently preferred embodiment of the invention has been illustrated and described, it should be appreciated that principles of the invention are applicable to all embodiments that fall within the scope of the following claims.

What is claimed is:

1. In an automotive vehicle comprising a window wiping system having an electric motor that operates a window wiping mechanism for wiping a window and that is under the control of a motor control circuit that includes dual operator controls disposed in different locations of the vehicle;

each of said dual operator controls comprising a respective motor control switch that is selectively operable to an off position and at least one on position;

the vehicle further comprising an ignition switch comprising a feed terminal to which a feed voltage is supplied and an ignition terminal that is connected to the feed terminal when the ignition switch is in a non-off position, the motor control circuit further comprising interfacing circuitry interfacing said motor control switches with said motor;

the improvement which comprises:

a) selector means, including a selector switch that is selectively operable to first and second positions, for selecting one of said motor control switches to have control over said motor to the exclusion of the other of said motor control switches;

b) feeds from said ignition terminal and said selector switches to said interfacing circuitry;

c) said interfacing circuitry comprising means enabling a first of said motor control switches to control operation of said electric motor to the exclusion of a second of said motor control switches when said selector switch is in its first position and said ignition switch is in the non-off position and means enabling the second of said motor control switches to control operation of said electric motor to the exclusion of the first of said motor control switches when said selector switch is in its second position and said ignition switch is in the non-off position;

d) and wherein the respective feeds from the respective motor control switches to said interfacing circuitry connect to a common input of said interfacing circuitry and comprise respective uni-directional current conductors between the respective motor control switches and the common input of said interfacing circuitry, said respective uni-directional current conductors being connected in their respective feeds to allow current flow in the same direction relative to said common input of said interfacing circuitry while blocking current flow in the opposite direction relative to said common input of said interfacing circuitry.

2. The improvement set forth in claim 1 in which said uni-directional current conductors comprise respective diodes.

3. The improvement set forth in claim 2 in which said diodes comprise respective anode and cathode terminals, and said anode terminals of said diodes are connected to said common input of said interfacing circuitry.

4. The improvement set forth in claim 1 in which said window is the windshield of the vehicle, the vehicle has a right-side driver station on the right side of the vehicle and a left-side driver station on the left side of the vehicle, and said motor control switches are located respectively at said right- and left-side driver stations.

5. The improvement set forth in claim 1 including a respective further feed from each respective motor control switch to a further common input of said interfacing circuitry, each respective further feed comprising a respective further uni-directional current conductor between the respective motor control switch and the further common input of said interfacing circuitry, said respective further uni-directional current conductors being connected in their respective feeds to allow current flow in the same direction relative to said further common input of said interfacing circuitry while blocking current flow in the opposite direction relative to said further common input of said interfacing circuitry.

6. The improvement set forth in claim 1 including two respective further feeds from each respective motor control switch to a respective one of two further common inputs of said interfacing circuitry, each respective further feed comprising a respective further uni-directional current conductor between the respective motor control switch and the respective further common input of said interfacing circuitry, said respective further uni-directional current conductors being connected in their respective feeds to allow current flow in the same direction relative to the respective further common input of said interfacing circuitry while blocking current flow in the opposite direction relative to the respective further common input of said interfacing circuitry.

7. The improvement set forth in claim 6 in which said interfacing circuitry comprises a controlled conduction device having a control input and a controlled output controlled by said control input, and means connecting said control input of said controlled conduction device and said selector switch in a series circuit to said ignition terminal of said ignition switch.

8. The improvement set forth in claim 7 in which said controlled conduction device is a relay, said control input of said controlled conduction device is a selectively energizable coil of said relay, said controlled output of said controlled conduction device is a movable contact of said relay that is selectively connectable with first and second output terminals of said relay for making contact with said first output terminal of said relay when said coil is not energized and for making contact with said second output terminal of said relay when said coil is energized, and respective feeds from said first output terminal of said relay to one of said motor control switches and from said second output terminal of said relay to the other of said motor control switches.

9. The improvement set forth in claim 8 in which said series circuit comprises a current overload protection device and said selector switch, in that order, between said ignition terminal of said ignition switch and said control input of said controlled conduction device.

10. The improvement set forth in claim 8 in which said common inputs of said interfacing circuitry are disposed on an electronic control module that operates said motor in accordance with operation of the particular motor control switch enabled to control said motor by said selector switch, each of said motor control switches having three operating positions, namely a high speed position, a low speed position, and an intermittent position, and wherein, when said ignition switch is in the non-off position, the particular motor control switch enabled by said selector switch causes said electronic control module to operate said motor at high speed when the enabled motor control switch is in high speed position, causes said electronic control module to operate said motor at low speed when the enabled motor control switch is in low speed position, and causes said electronic control module to operate said motor intermittently when the enabled motor control switch is in intermittent position.

11. The improvement set forth in claim 10 wherein the vehicle further includes a washer system for dispensing washer fluid for use in wiping the window and further including dual washer system control switches each disposed in association with a respective motor control switch, each washer system control switch being a normally open switch that is selectively enabled to operate said washer system concurrent with enablement of the associated motor control switch by said selector switch.

12. In an automotive vehicle comprising a window wiping system having an electric motor that operates a window wiping mechanism for wiping a window and that is under the control of a motor control circuit that includes dual operator controls disposed in different locations of the vehicle;

each of said dual operator controls comprising a respective motor control switch that is selectively operable to an off position and at least one on position;

the motor control circuit further comprising interfacing circuitry, including an electronic control module, interfacing said motor control switches with said motor; the improvement which comprises:

a) selector means, including a selector switch that is selectively operable to first and second positions, for selecting one of said motor control switches to have control over said motor to the exclusion of the other of said motor control switches;

b) feeds from said selector switches to said interfacing circuitry;

c) said interfacing circuitry comprising means providing for a first of said motor control switches to control operation of said electric motor to the exclusion of a second of said motor control switches when said selector switch is in its first position and means providing for the second of said motor control switches to control operation of said electric motor to the exclusion of the first of said motor control switches when said selector switch is in its second position;

d) wherein respective feeds from the respective motor control switches to said interfacing circuitry connect to a respective common input of said electronic control module and comprise respective uni-directional current conductors between the respective motor control switches and the respective common input of said electronic control module, said respective uni-directional current conductors being connected in their respective feeds to allow current flow in the same direction relative to the common input of said electronic control module to which they are connected while blocking current flow in the opposite direction relative to the common input of said electronic control module to which they are connected; and e) said interfacing circuitry further comprises a controlled conduction device having a control input and a controlled output controlled by said control input, means connecting said controlled output to both said motor control switches, and means connecting said input of said controlled conduction device through said selector switch to a power feed for causing said controlled conduction device to operate to a first condition when said selector switch is in its first position to select said first motor control switch to control said motor to the exclusion of said second motor control switch and for causing said controlled conduction device to operate to a second condition when said selector switch is in its second position to select said second motor control switch to control said motor to the exclusion of said first motor control switch.

13. The improvement set forth in claim 12 in which said controlled output of said controlled conduction device comprises first and second output terminals, and wherein a first switch feed connects said first output terminal of said controlled conduction device to an input terminal of said first motor control switch, and a second switch feed connects said second output terminal of said controlled conduction device to an input terminal of said second motor control switch.

14. The improvement set forth in claim 13 in which said controlled conduction device is a relay, said control input of said controlled conduction device is a selectively energizable coil of said relay, said controlled output of said controlled conduction device is a movable contact of said relay that is selectively connectable with said first and second output terminals of said controlled conduction device for making contact with said first output terminal of said controlled conduction device when said coil is not energized and for making contact with said second output terminal of said controlled conduction device when said coil is energized.

15. The improvement set forth in claim 14 in which said uni-directional current conductors comprise respective diodes having respective anode and cathode terminals, said anode terminals of said diodes are connected to the respective common input of said interfacing circuitry, and each motor control switch is enabled by said relay providing a ground signal to the input terminal thereof, each said motor control switch comprising for each of its at least one on positions, a normally open switch contact that is closed to apply a ground signal provided to it from said relay, to a cathode of a respective diode.

16. The improvement set forth in claim 15 in which said at least one on position of each of said motor control switches comprises three operating positions, namely a high speed position, a low speed position, and an intermittent position, and wherein the particular motor control switch enabled by said selector switch causes said electronic control module to operate said motor at high speed when the enabled motor control switch is in high speed position, causes said electronic control module to operate said motor at low speed when the enabled motor control switch is in low speed position, and causes said electronic control module to operate said motor intermittently when the enabled motor control switch is in intermittent position.

17. The improvement set forth in claim 12 in which said window is the windshield of the vehicle, the vehicle has a right-side driver station on the right side of the vehicle and a left-side driver station on the left side of the vehicle, and said motor control switches are located respectively at said right- and left-side driver stations.

18. The improvement set forth in claim 12 wherein the vehicle further comprises an ignition switch comprising a feed terminal to which a feed voltage is supplied and an ignition terminal that is connected to the feed terminal when the ignition switch is in a non-off position, and said power feed that is provided through said selector switch to said input of said controlled conduction device is provided from the ignition terminal of said ignition switch when said ignition switch is in a non-off position.

19. In an automotive vehicle comprising a window wiping system having an electric motor that operates a window wiping mechanism for wiping a window and that is under the control of a motor control circuit that includes dual operator controls disposed in different locations of the vehicle;

each of said dual operator controls comprising a respective motor control switch that is selectively operable to an off position and at least one on position;

the vehicle further comprising an ignition switch comprising a feed terminal to which a feed voltage is supplied and an ignition terminal that is connected to the feed terminal when the ignition switch is in a non-off position, the motor control circuit further comprising interfacing circuitry interfacing said motor control switches with said motor;

the improvement which comprises:

a) selector means, including a selector switch that is selectively operable to first and second positions, for selecting one of said motor control switches to have control over said motor to the exclusion of the other of said motor control switches;

b) feeds from said ignition terminal and said selector switch to said interfacing circuitry;

c) said interfacing circuitry comprising a relay having a coil and a movable contact that is selectively connectable with first and second output terminals of said relay for making contact with said first output terminal of said relay when said coil is not energized and for making contact with said second output terminal of said relay when said coil is energized, and respective feeds from said first output terminal of said relay to one of said motor control switches and from said second output terminal of said relay to the other of said motor control switches; and d) means connecting said relay coil and said selector switch in a series circuit to said ignition terminal of said ignition switch.

20. The improvement set forth in claim 19 wherein the respective feeds from the respective motor control switches to said interfacing circuitry connect to a common input of said interfacing circuitry and comprise respective uni-directional current conductors between the respective motor control switches and the common input of said interfacing circuitry, said respective uni-directional current conductors being connected in their respective feeds to allow current flow in the same direction relative to said common input of said interfacing circuitry while blocking current flow in the opposite direction relative to said common input of said interfacing circuitry.

* * * * *